No. 656,960. Patented Aug. 28, 1900.
R. T. GEER.
HORSE CHECK.
(Application filed May 3, 1900.)
(No Model.)
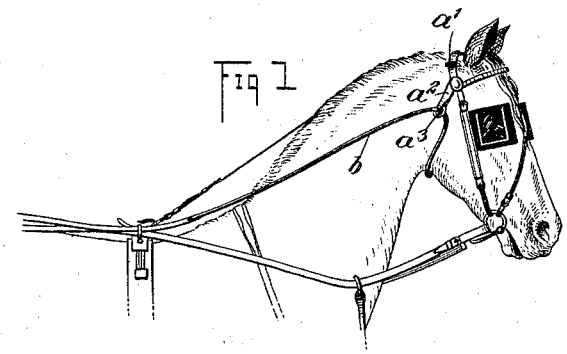
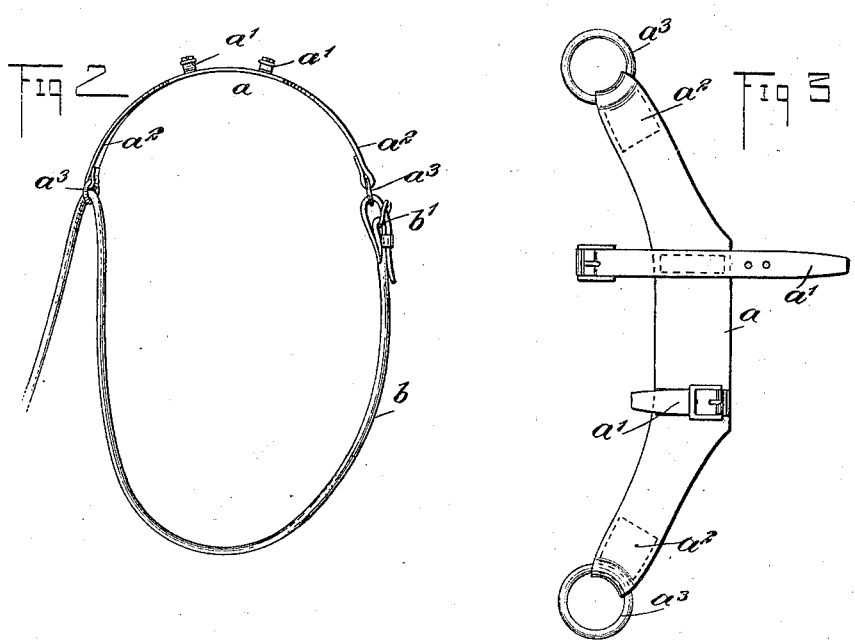
WITNESSES:
INVENTOR
Robert T. Geer.
BY
ATTORNEYS
THE NORRIS PETERS CO., PHOTO-LITHO., WASHINGTON, D. C.

UNITED STATES PATENT OFFICE.

ROBERT T. GEER, OF NEW YORK, N. Y.

HORSE-CHECK.

SPECIFICATION forming part of Letters Patent No. 656,960, dated August 28, 1900.

Application filed May 3, 1900. Serial No. 15,360. (No model.)

*To all whom it may concern:*

Be it known that I, ROBERT T. GEER, a citizen of the United States, and a resident of the city of New York, borough of Manhattan, in the county and State of New York, have invented a new and Improved Horse-Check, of which the following is a full, clear, and exact description.

The purpose of this invention is to provide a horse-check of that class in which a rein is passed under the throat of a horse, so as to put pressure upon the horse at this point when it is desired to stop the animal.

My invention consists in a certain peculiar construction which enables the device to be very readily attached to and detached from harness of the usual sort.

With a horse-check constructed according to my invention it may be put on any set of harness desired and will in no way interfere with the movement of the horse or the use of the regular parts of the harness.

This specification is the disclosure of one form of my invention, while the claim defines the actual scope thereof.

Reference is to be had to the accompanying drawings, forming a part of this specification, in which similar characters of reference indicate corresponding parts in all the views.

Figure 1 is a perspective view of the invention. Fig. 2 is a front elevation showing the device detached from the horse, and Fig. 3 is a plan view of the bracket-strap.

The horse-check comprises practically two parts—a bracket-strap $a$ and a checkrein $b$. The bracket-strap $a$ has a main or middle portion provided with short buckle-straps $a'$. This main or middle portion of the bracket-strap is adapted to lie directly under the top strap of the harness, as shown in Fig. 1, and to be fastened securely thereto by the buckle-straps $a'$. The end portions $a^2$ of the bracket-strap $a$ are extended diagonally of the main or middle part and rearward of the top strap of the harness, so that they will lie in the position shown in Fig. 1—that is to say, just over the throat of the horse and immediately rearward of the jaw-bones. The ends $a^2$ of the bracket-strap $a$ may be provided with rings $a^3$ or any other devices for performing the functions which will be explained fully hereinafter. One end of the checkrein $b$ is furnished with a buckle $b'$ or any like device for attaching it to one of the rings $a^3$, and the checkrein is then passed under the throat of the horse and through the other ring $a^3$ of the bracket-strap. From this point the checkrein passes rearward to the vehicle, or, if the device be applied to a saddle-horse, to the saddle, so as to be within easy reach of the rider. Any desired devices may be provided for attaching the end of the rein to the vehicle. These devices do not, however, form any part of my invention and may be used or dispensed with at will. Now it will be observed that by this arrangement simply a pull on the rein $b$ will check the horse, since it will tighten the rein under the throat of the horse and draw the ends $a^2$ of the bracket-strap down forcibly against the sides of the neck and bring pressure upon the glands of the neck which lie just back of the jaw-bones and which form the most sensitive parts of the neck of the horse. It will be obvious that this device may be applied to any harness, either riding or driving, and that by reason of the peculiar form of the bracket-strap the rein $b$ is held in position properly to throttle the horse. When the pull on the rein $b$ is relaxed, the rings $a^3$ at once fly up and resume their natural position, thus at once relieving the pressure on the throat of the horse and making it impossible to strangle the horse from the rein $b$ becoming stuck in the rings $a^3$.

Having thus described my invention, I claim as new and desire to secure by Letters Patent—

A horse-check, comprising a bracket-strap, and a checkrein, the bracket-strap having a main or middle portion adapted to lie directly under the top strap of the bridle and provided with means for fastening it to the top strap of the bridle, and the end portions of the bracket-strap being extended slightly rearward of the bridle, and the checkrein having one end attached to one end of the bracket-strap, the checkrein being slidably engaged with the other end of the bracket-strap, for the purpose specified.

In testimony whereof I have signed my name to this specification in the presence of two subscribing witnesses.

ROBERT T. GEER.

Witnesses:
I. B. OWENS,
JNO. M. RITTER.